United States Patent
Otosaka

(10) Patent No.: US 9,440,874 B2
(45) Date of Patent: Sep. 13, 2016

(54) GLASS BASE MATERIAL ELONGATING METHOD AND GLASS BASE MATERIAL ELONGATING APPARATUS

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 474 days.

(21) Appl. No.: 13/743,353

(22) Filed: Jan. 17, 2013

(65) Prior Publication Data

US 2013/0186148 A1  Jul. 25, 2013

(30) Foreign Application Priority Data

Jan. 19, 2012  (JP) ................. 2012-009029

(51) Int. Cl.
  *C03B 37/02* (2006.01)
  *C03B 37/15* (2006.01)
  *C03B 37/012* (2006.01)

(52) U.S. Cl.
  CPC ........... *C03B 37/15* (2013.01); *C03B 37/0124* (2013.01); *C03B 37/0126* (2013.01); *Y02P 40/57* (2015.11)

(58) Field of Classification Search
  CPC ...... C03B 37/025; C03B 37/03; C03B 37/15
  See application file for complete search history.

(56) References Cited

U.S. PATENT DOCUMENTS

2012/0222452 A1  9/2012  Otosaka

FOREIGN PATENT DOCUMENTS

| JP | H03-115131 A | 5/1991 |
|---|---|---|
| JP | H05-078139 A | 3/1993 |

OTHER PUBLICATIONS

European Search Report completed on Apr. 11, 2013 for EP application No. 13 15 1591.

*Primary Examiner* — Angela Ortiz
*Assistant Examiner* — Cynthia Szewczyk

(57) ABSTRACT

Provided is a glass base material elongating method of using a glass base material elongation apparatus including a heating furnace, a feeding mechanism, and a pulling mechanism to elongate the rod-shaped glass base material to form a thinner glass rod, the method comprising gripping a pulling dummy rod connected to a bottom end of the glass base material with first pulling rollers of the pulling mechanism and, together with the feeding mechanism, feeding the glass base material to the heating furnace; and before a pulling force necessary for pulling the pulling dummy rod to elongate the glass base material reaches a load force that causes slipping between the pulling dummy rod and the first pulling rollers, gripping and pulling the pulling dummy rod with second pulling rollers of the pulling mechanism in addition to the first pulling rollers.

5 Claims, 5 Drawing Sheets

GLASS BASE MATERIAL ELONGATING METHOD AND GLASS BASE MATERIAL ELONGATING APPARATUS

The content of the following Japanese patent application is incorporated herein by reference: NO. 2012-009029 filed on Jan. 19, 2012.

BACKGROUND

1. Technical Field

The present invention relates to a glass base material elongating method and a glass base material elongating apparatus for heating and elongating a glass base material to form a glass rod with a thinner outer diameter.

2. Related Art

When manufacturing a quartz glass rod, which is representative of an optical fiber preform, a large glass base material is manufactured in advance, and is then elongated using an elongation furnace to obtain a thinner glass rod.

In recent years, when manufacturing optical fiber, there has been a trend of using optical fiber preforms with larger diameters in order to improve mass production. Accordingly, the difference in the outer diameter between the glass base material and the elongated glass rod has become smaller. Glass rods with diameters up to approximately 90 mm can be elongated using a glass lathe, and therefore conventional methods that include performing rough elongation using an elongation furnace and then performing precise elongation using a glass lathe have been common. However, for glass rods having diameters of 100 mm to 120 mm or more that are to be used as optical fiber preforms, it is not easy to perform elongation using a glass lathe, and even when it is possible, the cost is excessive. Therefore, there has been increased need for improving the restriction of outer diameter using an elongation furnace, without needing to use a glass lathe.

In order to improve the outer diameter control ability of the elongation process, it is necessary to narrow the region of the glass base material being heated. If portions that experience a large amount of diameter change, such as the border between a trunk portion and a tapered portion of the glass base material, are not heated locally, the elongated glass rod will be greatly affected by the shape of the glass base material prior to the elongation. However, although the diameter control ability can be improved by narrowing the region being heated, the pulling force needed to soften and deform the glass has a strong inversely proportional relationship to the length of the portion to be softened and deformed. Furthermore, when elongation is begun, the glass base material is heated and softened, and the lower portion of the pulling dummy rod is pulled and elongated by the pulling roller. However, due to reasons such as the temperature of the glass not being raised enough when elongation begins and the heated region being narrower than during normal elongation, the pulling force could be less than the force used during normal elongation for the trunk portion of the glass base material, which results in the desired shape not being realized.

When such a large pulling force is needed for the elongation, the contact surfaces between the pulling rollers and the pulling dummy rod can slip, causing the actual pulling speed to be lower than the set pulling speed. As a result, the diameter of the glass rod is greater than the intended elongation diameter. When the heated region is narrowed in order to improve the outer diameter control ability, this slipping between the pulling rollers and the pulling dummy rod is particularly noticeable during the start of the elongation. In order to decrease the pulling force, the temperature during the initial elongation period can be set to be higher than the temperature during normal elongation (normal temperature), or the feeding speed and pulling speed can be can be set to be lower than the speed during normal elongation (normal speed). However, changes in the temperature or feeding speed cause changes in the shape of the softened glass portion and the temperature distribution, which creates problems such as fluctuations in the outer diameter of the elongated glass rod. As a result, the objective of improving the outer diameter control ability using an elongation furnace cannot be realized.

In order to solve these problems, it is an objective of the present invention to provide a glass base material elongating method and a glass base material elongating apparatus that, when elongating a glass base material to obtain a thinner glass rod, can restrict slipping of the pulling rollers on the pulling dummy rod or glass rod and can improve the outer diameter control ability of an elongation furnace.

SUMMARY

According to a first aspect of the present invention, provided is a glass base material elongating method of using a glass base material elongation apparatus including a heating furnace, a feeding mechanism, and a pulling mechanism to elongate the rod-shaped glass base material to form a thinner glass rod, the method comprising gripping a pulling dummy rod connected to a bottom end of the glass base material with first pulling rollers of the pulling mechanism and, together with the feeding mechanism, feeding the glass base material to the heating furnace; and before a pulling force necessary for pulling the pulling dummy rod to elongate the glass base material reaches a load force that causes slipping between the pulling dummy rod and the first pulling rollers, gripping and pulling the pulling dummy rod with second pulling rollers of the pulling mechanism in addition to the first pulling rollers.

According to a second aspect of the present invention, provided is a glass base material elongating apparatus that includes a heating furnace, a feeding mechanism, and a pulling mechanism and elongates a rod-shaped glass base material to form a thinner glass rod, wherein the pulling mechanism includes first pulling rollers that grip a pulling dummy rod connected to a bottom end of the glass base material and, together with the feeding mechanism, feed the glass base material into the heating furnace; and second pulling rollers that, before a pulling force necessary for pulling the pulling dummy rod to elongate the glass base material reaches a load force that causes slipping between the pulling dummy rod and the first pulling rollers, grips and pulls the pulling dummy rod together with the first pulling rollers.

With the present invention, slipping of the pulling rollers during an initial period of elongation when a particularly large pulling force is necessary can be prevented, the outer diameter control of an elongation furnace can be improved, and the precision of the outer diameter of a glass rod obtained through elongation can be increased. The summary clause does not necessarily describe all necessary features of the embodiments of the present invention. The present invention may also be a sub-combination of the features described above.

DESCRIPTION OF EXEMPLARY EMBODIMENTS

Figure 1:
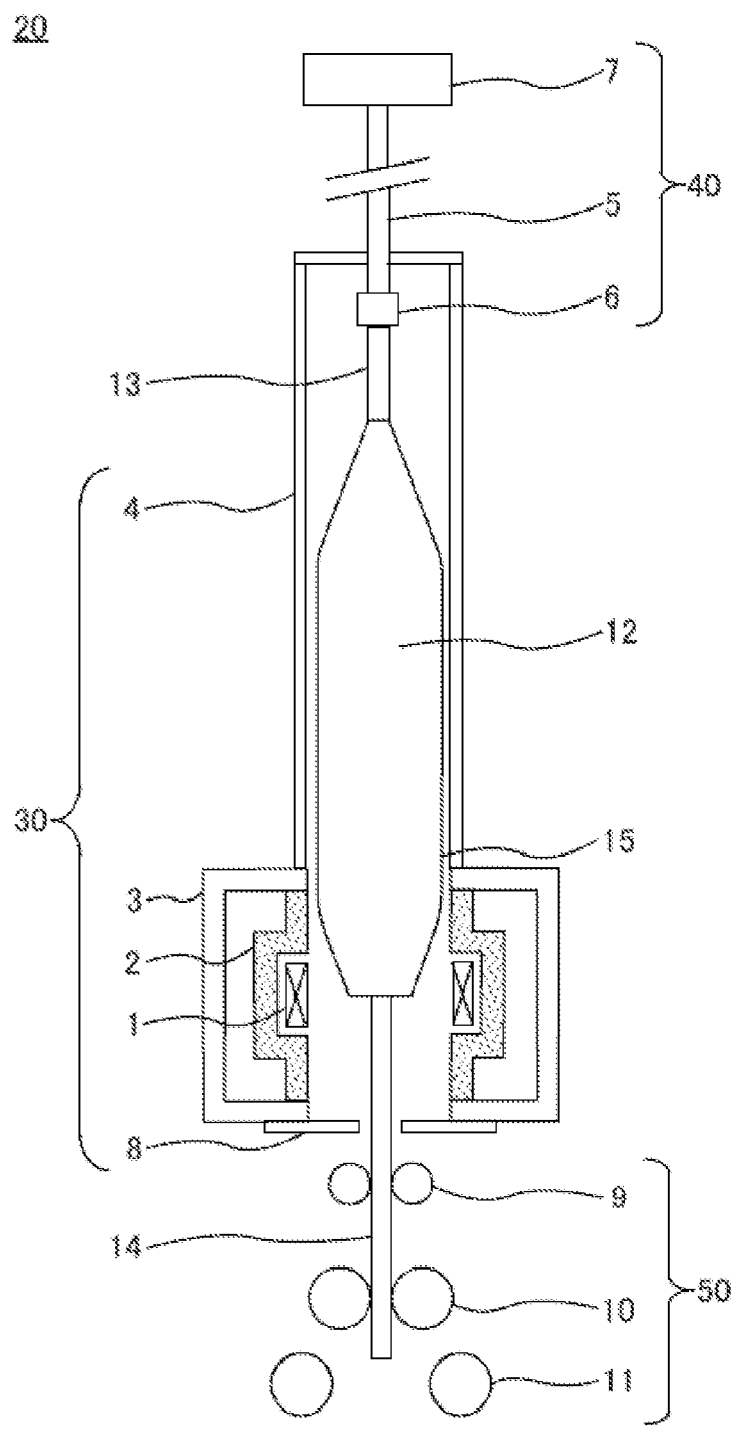
FIG. 1 is a schematic cross-sectional view of an exemplary glass base material elongating apparatus.

FIG. 1 is a schematic cross-sectional view of an exemplary glass base material elongating apparatus 20. In FIG. 1, a glass base material 12 includes a hanging dummy rod 13 at the top end thereof and a pulling dummy rod 14 at the bottom end thereof. The glass base material elongating apparatus 20 includes three main portions, which are a heating furnace 30, a feeding mechanism 40, and a pulling mechanism 50.

The heating furnace 30 includes a heater 1, a heat insulator 2, a water-cooled chamber 3 surrounding the heater 1 and the heat insulator 2, a top chamber 4 connected to the top portion of the water-cooled chamber 3, and a lower gas seal 8 connected to the bottom portion of the water-cooled chamber 3. The feeding mechanism 40 includes a feeding apparatus 7 that is provided on the top portion of the heating furnace 30 and can move up and down, and a hanging shaft 5 and connecting jig 6 that are connected to the feeding apparatus 7. A portion of the hanging shaft 5 is inserted into the top chamber 4.

The pulling mechanism 50 includes a set of guide rollers 9, a set of first pulling rollers 10, and a set of second pulling rollers 11 that can grip and release the pulling dummy rod 14 or an elongated glass rod. The guide rollers 9 are formed by heat-resistant rollers of carbon or the like, and function to guide the pulling dummy rod 14 or glass rod into the center of the apparatus. The first pulling rollers 10 are arranged below the guide rollers 9, and the second pulling rollers 11 are arranged below the first pulling rollers 10. The first pulling rollers 10 and the second pulling rollers 11 are driven by a motor, not shown, and grip and pull the pulling dummy rod 14 or glass rod, thereby elongating the glass base material 12 to have a suitable diameter. The glass base material 12 is connected to the feeding apparatus 7 at the top end of the hanging dummy rod 13, via the connecting jig 6 and the hanging shaft 5.

Before starting the elongation, the feeding apparatus 7 feeds the glass base material 12 downward. The first pulling rollers 10 of the pulling mechanism 50 grip the pulling dummy rod 14 connected to the bottom end of the glass base material 12 and, together with the feeding apparatus 7, feed the glass base material 12 into the heater 1. When the glass base material 12 is fed into the heater 1, the second pulling rollers 11 are in an open state. The feeding apparatus 7 and the first pulling rollers 10 synchronize their speeds, and feed the glass base material 12 downward to a predetermined position in the heater 1. When the glass base material 12 has been fed to the predetermined position in the heater 1, the first pulling rollers 10 and the second pulling rollers 11 grip the pulling dummy rod 14 and pull downward with a speed greater than the feeding speed of the feeding apparatus 7, thereby obtaining a glass rod that is thinner than the glass base material 12.

In order to obtain a glass rod with the desired diameter, the glass base material elongating apparatus 20 elongates the glass base material 12 by using feed forward control that measures the shape of the glass base material 12 in advanced and, based on this shape, determines in advance the pulling speed at which the glass rod is pulled downward and the feeding speed at which the glass base material 12 is pulled downward, over the entire length thereof. The glass base material elongating apparatus 20 may elongate the glass base material 12 using feed back control that measures the outer diameter of a softened portion of the glass where the thinning occurs and the outer diameter of the elongated glass rod, and determines the feeding speed and the pulling speed based on this information.

Figure 2:
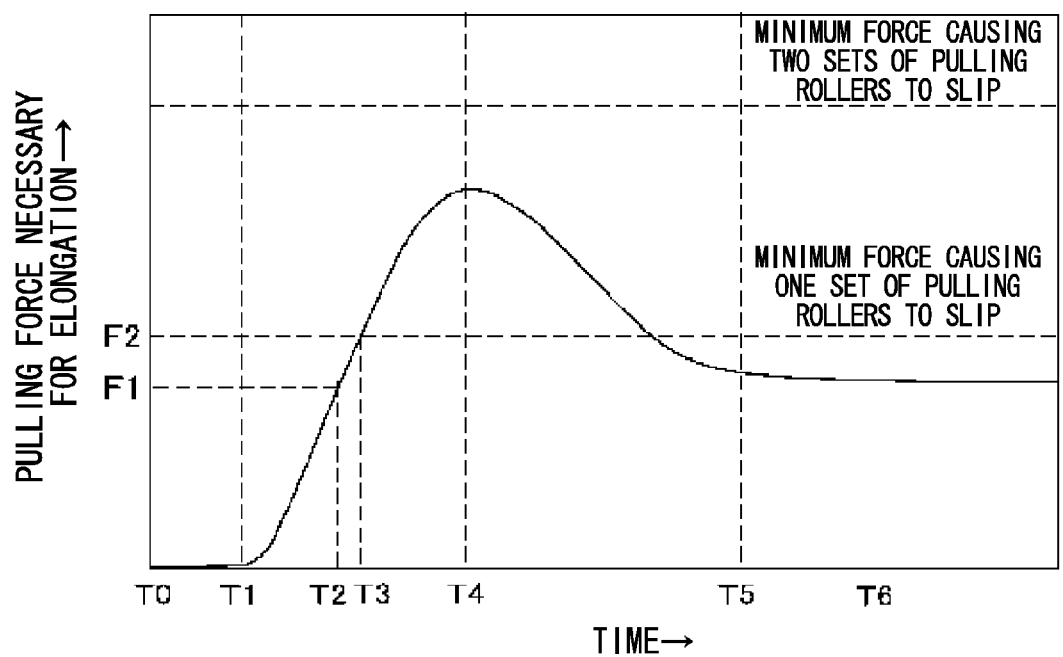
FIG. 2 is a graph showing change over time of the necessary pulling force during elongation.

FIG. 2 is a graph showing the change over time of the necessary pulling force in the elongation step. As shown in FIG. 2, from a time T1, at which the pulling of the pulling dummy rod 14 begins with a speed greater than the feeding speed of the feeding apparatus 7, the pulling force of the pulling dummy rod 14 necessary for elongation increases. At time T3, the pulling force exceeds the slipping limit force F2, which if the minimum limit at which pulling can be performed with one set of pulling rollers without slipping. The pulling force is extremely large near time T4, which is the time at which the bottom end of the trunk portion 15 of the glass base material 12 begins hanging in the heater 1. After this, the pulling force decreases, and reaches a constant value near the time T5.

From the time T3 to the time T5, during which the pulling force is greater than or equal to the slipping limit force F2, if the glass base material 12 is elongated by only one set of the first pulling rollers 10 or the second pulling rollers 11, slipping occurs between the pulling dummy rod 14 and the rollers. When there is slipping between the pulling dummy rod 14 and the rollers, the pulling speed is less than the set value, and this causes a change (increase) in the diameter of the glass rod being elongated. The sliding limit force is one example of a load causing slipping between the pulling rollers and the pulling dummy rod 14.

The glass base material elongating method of the present embodiment is described in detail using FIGS. 3 to 8. FIGS. 3 to 8 show the change over time in the relative positions of the heating furnace 30, the glass base material 12, the first pulling rollers 10, the second pulling rollers 11, and the pulling dummy rod 14. Components near the top chamber 4 and the feeding apparatus 7 arranged at the top portion of the heating furnace 30 are not shown.

Figure 3:
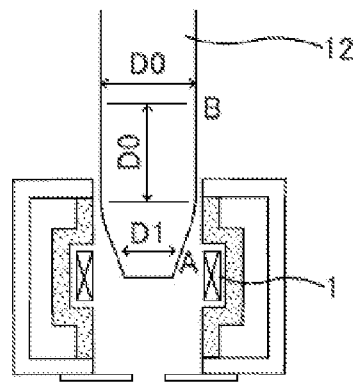
FIG. 3 is a schematic vertical cross-sectional view of the glass base material elongating apparatus in a state before elongation begins.

FIG. 3 is a schematic vertical cross-sectional view of the glass base material elongating apparatus 20 in a state before elongation begins. As shown in FIG. 3, the glass base material 12 is set in the glass base material elongating apparatus 20 such that the bottom end thereof moves up and down in the center of the heater 1. In this state, the glass base material elongating apparatus 20 raises the temperature of the heater 1 to approximately 1800° C. to 2200° C., thereby softening the bottom end of the glass base material 12. At the tapered portion on the bottom end of the glass base material 12, the point that is to have the elongation target diameter $D_1$ is point A, and the point that is above the bottom end of the glass base material trunk portion by a length of the outer diameter $D_0$ is point B.

Figure 4:
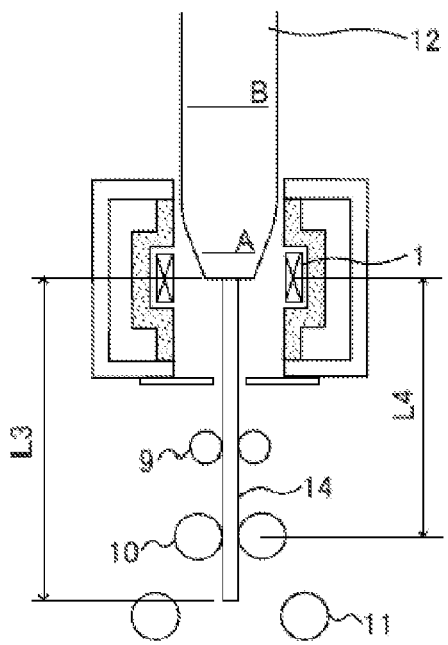
FIG. 4 is a schematic cross-sectional view of the glass base material elongating apparatus in a state where the pulling dummy rod is connected to the glass base material.

FIG. 4 is a schematic cross-sectional view of the glass base material elongating apparatus 20 in a state where the pulling dummy rod 14 is connected to the glass base material 12. As shown in FIG. 4, the guide rollers 9 and the first pulling rollers 10 grip the quartz glass pulling dummy rod 14 and raise the pulling dummy rod 14 by driving the first pulling rollers 10, thereby fusing the pulling dummy rod 14 to the bottom end of the glass base material 12. The distance $L_3$ from the bottom end of the glass base material 12 to the bottom end of the pulling dummy rod 14 is set to be longer than the distance $L_4$ from the center of the heater 1 to the center of the first pulling rollers 10. When the first pulling rollers 10 are driven and the pulling dummy rod 14 is raised, the distance $L_3$ is longer than the distance $L_4$, and therefore the top end of the pulling dummy rod 14 contacts the bottom end of the glass base material 12. With the top end of the pulling dummy rod 14 in contact with the bottom end of the glass base material 12, when the heater 1 applies heat, the pulling dummy rod 14 is fused to the glass base material 12. This step of fusing the pulling dummy rod 14 can be realized in advance by another apparatus, thereby decreasing the time needed to connect the pulling dummy rod 14. After the pulling dummy rod 14 is fused, while the glass base material 12 is being lowered, the first pulling rollers 10 are driven and the pulling dummy rod 14 is pulled, thereby elongating the glass base material 12.

Figure 5:
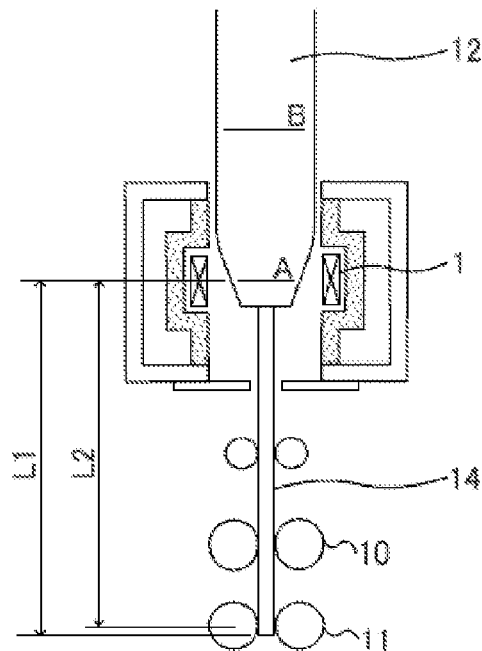
FIG. 5 is a schematic vertical cross-sectional view of the glass base material elongating apparatus in a state before the elongation is begun.

FIG. 5 is a schematic vertical cross-sectional view of the glass base material elongating apparatus 20 in a state before the elongation is begun. As shown in FIG. 5, from time T1 at which point A of the glass base material 12 has arrived near the center of the heater 1, the first pulling rollers 10 and the second pulling rollers 11 grip the pulling dummy rod 14 and begin pulling the glass base material 12. At this time, the ratio ($V_1/V_0$) between the feeding speed $V_0$ of the glass base material 12 and the pulling speed $V_1$ of the pulling dummy rod 14 gradually increases, and the pulling force increases suddenly.

The distance $L_1$ from point A of the glass base material 12 to the bottom end of the pulling dummy rod 14 is set to be longer than the distance $L_2$ from the center of the heater 1 to the center of the second pulling roller 11. Since the distance $L_1$ is greater than the distance $L_2$, from the time T1, the pulling dummy rod 14 can be gripped and pulled by two sets of rollers, i.e. the first pulling rollers 10 and the second pulling rollers 11. The position at which point A is near the center of the heater 1 is an example of the predetermined position described above.

Figure 6:
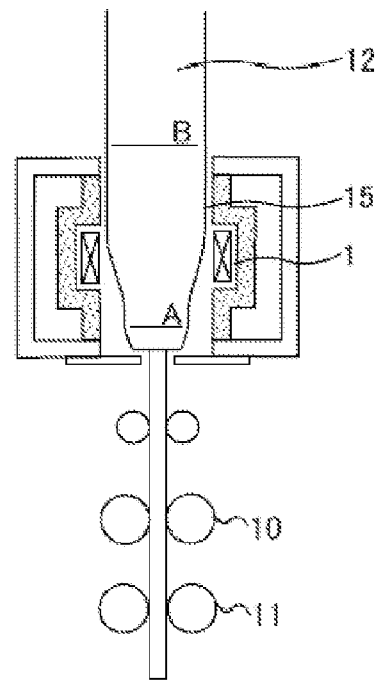
FIG. 6 is a schematic vertical cross-sectional view of the glass base material elongating apparatus in a state where the trunk portion of the glass base material begins to hang in the heater.

FIG. 6 is a schematic vertical cross-sectional view of the glass base material elongating apparatus 20 in a state where the trunk portion 15 of the glass base material 12 begins to hang in the heater. The pulling force is very large near time T4, which is the time at which the trunk portion 15 of the glass base material 12 begins to hang in the heater 1.

Figure 7:
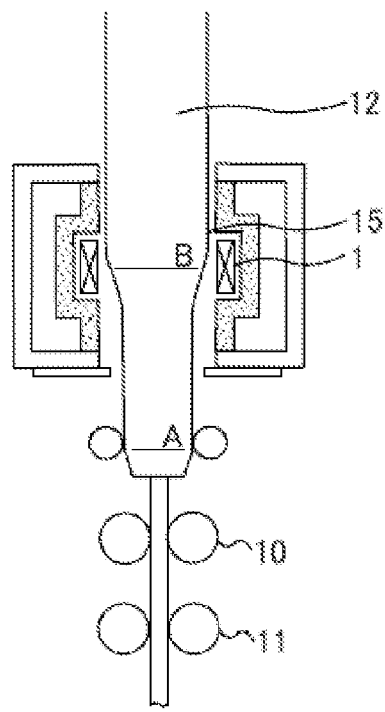
FIG. 7 is a schematic vertical cross-sectional view of the glass base material elongating apparatus in a state where point B of the glass base material has arrived at the center of the heater.

FIG. 7 is a schematic vertical cross-sectional view of the glass base material elongating apparatus in a state where point B of the glass base material 12 has arrived at the center of the heater 1. At time T5, when point B of the glass base material 12 is at the center of the heater 1, the pulling force is at an almost constant value. At this time, the pulling force is less than the slipping limit force F2, as shown in FIG. 2.

Figure 8:
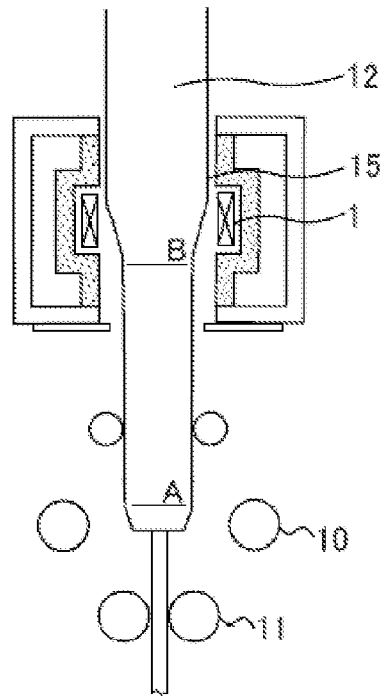
FIG. 8 is a schematic vertical cross-sectional view of a glass base material elongating apparatus in a state where the first pulling rollers are open.

FIG. 8 is a schematic vertical cross-sectional view of a glass base material elongating apparatus 20 in a state where the first pulling rollers 10 are open. When the glass base material 12 has been fed downward from the position shown in FIG. 7 to the position shown in FIG. 8, the first pulling rollers 10 release the pulling dummy rod 14. The pulling force is less than the slipping limit force F2 for one set of rollers, and therefore slipping between the pulling dummy rod 14 and the second pulling rollers 11 does not occur when the first pulling rollers 10 are opened.

In the embodiment shown in FIGS. 3 to 8, at the time when point A has reached near the center of the heater 1, by setting the distance $L_1$ from point A of the glass base material 12 to the bottom of the pulling dummy rod 14 to be longer than the distance $L_2$ from the center of the heater 1 to the center of the second pulling roller 11, the first pulling rollers 10 and the second pulling rollers 11 grip the pulling dummy rod 14 and elongate the glass base material 12 from time T1. As a result, from time T3 to time T5, the pulling dummy rod 14 can be gripped by the first pulling rollers 10 and the second pulling rollers 11. Therefore, a force that is double the force used when only the first pulling rollers 10 are driven is applied to the pulling dummy rod 14, thereby enabling the glass base material 12 to be elongated without slipping between the pulling dummy rod 14 and the first pulling rollers 10 and second pulling rollers 11 and restricting fluctuation in the diameter of the elongated glass rod.

By holding the pulling dummy rod 14 with the set of first pulling rollers 10 and the set of second pulling rollers 11 and performing the elongating, the glass base material elongating apparatus 20 can use known air cylinders and roller shafts, and can elongate the glass base material 12 to have a suitable diameter while restricting fluctuation of the diameter and without damaging the pulling dummy rod 14.

The embodiment above describes a configuration in which the pulling dummy rod 14 is pulled by the first pulling rollers 10 and the second pulling rollers 11 from a time T1, which corresponds to the predetermined position, but it is not necessary for the pulling dummy rod 14 to be pulled by the first pulling rollers 10 and second pulling rollers 11 from time T1.

The following describes an example of another time corresponding to another predetermined position. In the glass base material elongating apparatus 20, T2 is set as the time when a pulling force F1 occurs, which is a force obtained by adding a margin of error to the force F2. From time T1 to time T2, the second pulling rollers 11 remain open, and the pulling dummy rod 14 is pulled by the first pulling rollers 10. At time T2, the glass base material elongating apparatus 20 closes the second pulling rollers 11 in addition to the first pulling rollers 10 to grip the pulling dummy rod 14. The pulling dummy rod 14 is set to be long enough that the pulling dummy rod 14 can be gripped by the second pulling rollers 11 at time T2. The slipping limit force F2 for one set of pulling rollers, the force F1 including the margin of error, the time T2 at which gripping by the two sets of pulling rollers begins, and the length of the pulling dummy rod 14 can be obtained analytically or through experimentation from the glass base material elongating apparatus 20.

By gripping and elongating with both the first pulling rollers 10 and the second pulling rollers 11 at time T2 prior to time T3, slipping between the pulling dummy rod 14 and the rollers can be restricted, thereby restricting the diameter fluctuation. Gripping and pulling the pulling dummy rod 14 with both the first pulling rollers 10 and the second pulling rollers 11 can be any time before time T3, and may be before time T1.

(Embodiments)
(First Embodiment)

Here, ten glass base materials 12 with trunk portions 15 having diameters of $D_0=180$ mm were prepared, and elongation was performed under conditions of an elongation diameter $D_1=120$ mm, a distance $L_1=1350$ mm from point A to the bottom end of the pulling dummy rod 14, and a distance $L_2=1200$ mm from the center of the heater 1 to the center of the second pulling rollers. As shown in FIG. 4, at the time when point A of the glass base material 12 reached the center of the heater 1, the 14 was gripped by both the first pulling rollers 10 and the second pulling rollers 11. As shown in FIG. 7, when point B of the glass base material passed the center of the heater, the first pulling rollers were opened and gripping and pulling were performed only by the second pulling rollers 11. As a result, slipping did not occur between the hanging dummy rod 13 and the first pulling rollers 10 and second pulling rollers 11 during elongation, and it was confirmed that there was no fluctuation in the outer diameter.

FIRST COMPARATIVE EXAMPLE

Here, ten glass base materials 12 with trunk portions 15 having diameters of $D_0=180$ mm were prepared, and elongation was performed under conditions of an elongation diameter $D_1=120$ mm, a distance $L_1=1100$ mm from point A to the bottom end of the pulling dummy rod 14, and a distance $L_2=1200$ mm from the center of the heater 1 to the center of the second pulling rollers. In contrast to the state shown in FIG. 4, at the time when point A of the glass base material 12 reached the center of the heater 1, the bottom end of the pulling dummy rod 14 had not yet reached the second pulling rollers 11, and so gripping and pulling of the pulling dummy rod 14 could not be performed by both the first pulling rollers 10 and the second pulling rollers 11. As a result, slipping occurred between the pulling dummy rod 14 and the first pulling rollers 10 during elongation, and fluctuations from +2 mm to +9 mm were seen in eight of the ten glass base materials 12.

What is claimed is:

1. A glass base material elongating method of using a glass base material elongation apparatus including a heating furnace, a feeding mechanism, and a pulling mechanism to elongate a rod-shaped glass base material to form a thinner glass rod, the method comprising:
   gripping a pulling dummy rod connected to a bottom-most end of the glass base material with first pulling rollers of the pulling mechanism and, together with the feeding mechanism, feeding the glass base material to the heating furnace; and
   when point A, which is a point in a tapered portion at the bottom-most end of the glass base material at which the diameter of the glass base material is $D_1$, reaches the center of a heater in the heating furnace, gripping and pulling the pulling dummy rod with second pulling rollers of the pulling mechanism in addition to the first pulling rollers, the second pulling rollers being arranged below the first pulling rollers, wherein
   a length $L_1$ from the point A to a tip of the pulling dummy rod is set to be greater than a distance $L_2$ from the center of the heater to the center of the second pulling rollers.

2. The glass base material elongating method according to claim 1, wherein
   when feeding the glass base material into the heating furnace, with the second pulling rollers in an open state, speeds of the feeding mechanism and the first pulling rollers are synchronized and the glass base material is fed downward until the point A reaches the center of the heater, and
   when pulling the pulling dummy rod, while the feeding mechanism feeds the glass base material downward after the point A reaches the center of the heater, the first pulling rollers and the second pulling rollers pull the pulling dummy rod with a speed that is greater than a speed at which the feeding mechanism feeds the glass base material downward.

3. The glass base material elongating method according to claim 1, wherein
   after feeding the glass base material into the heating furnace, with the second pulling rollers in an open state, while the feeding mechanism feeds the glass base material downward until the point A reaches the center of the heater, the first pulling rollers pull the pulling dummy rod with a speed that is greater than a speed at which the feeding mechanism feeds the glass base material downward, and
   while the feeding mechanism feeds the glass base material downward after the point A reaches the center of the heater, the first pulling rollers and the second pulling rollers pull the pulling dummy rod with a speed that is greater than a speed at which the feeding mechanism feeds the glass base material downward.

4. The glass base material elongating method according to claim 1, wherein
   after point B, which is a point above a bottom end of a trunk portion of the glass base material by a length of an outer diameter $D_0$ of the glass base material, passes the center of the heater, either the first pulling rollers or the second pulling rollers are opened.

5. The glass base material elongating method according to claim 1, wherein the first pulling rollers and the second pulling rollers keep gripping and pulling the pulling dummy at least until point B, which is a point above a bottom end of a trunk portion of the glass base material by a length of an outer diameter $D_0$ of the glass base material, reaches the center of the heater.

* * * * *